United States Patent [19]

Fitzgerald, Jr.

[11] 3,740,472

[45] June 19, 1973

[54] WIDTH CONTROL CIRCUIT FOR A TELEVISION RECEIVER

[75] Inventor: William Vincent Fitzgerald, Jr., Indianapolis, Ind.

[73] Assignee: RCA Corporation, New York, N.Y.

[22] Filed: Nov. 24, 1971

[21] Appl. No.: 201,683

[52] U.S. Cl. ..... 178/7.5 SE, 178/DIG. 11, 315/27 R

[51] Int. Cl. .............................................. H04n 3/22

[58] Field of Search ..................... 178/7.5 R, 7.3 R, 178/7.5 OC, DIG. 11, 7.5 SE; 315/27 R, 27 TD, 28, 29

[56] References Cited

UNITED STATES PATENTS

| | | | |
|---|---|---|---|
| 3,612,756 | 10/1971 | Akatsu et al. | 178/7.5 DC |
| 2,579,627 | 12/1951 | Tourshou | 178/7.5 SE |
| 2,580,977 | 1/1952 | Tourshou et al. | 178/7.5 SE |
| 3,132,283 | 5/1964 | Jahns | 315/27 R |
| 3,649,901 | 3/1972 | Walter | 178/DIG. 11 |

*Primary Examiner*—Robert L. Griffin
*Assistant Examiner*—Richard Maxwell
*Attorney*—Eugene M. Whitacre

[57] ABSTRACT

Resistor and capacitor type width controls are combined in a manner to utilize the advantages of each in optimizing television picture reproduction, but in a manner to constrain the high voltages produced by the receiver's horizontal deflection circuit under incorrect adjustment conditions. Such combination can be used to reduce the possibility of the high voltage developed for the cathode-ray picture tube increasing to a value at which X-radiations can be produced.

4 Claims, 1 Drawing Figure

PATENTED JUN 19 1973
3,740,472
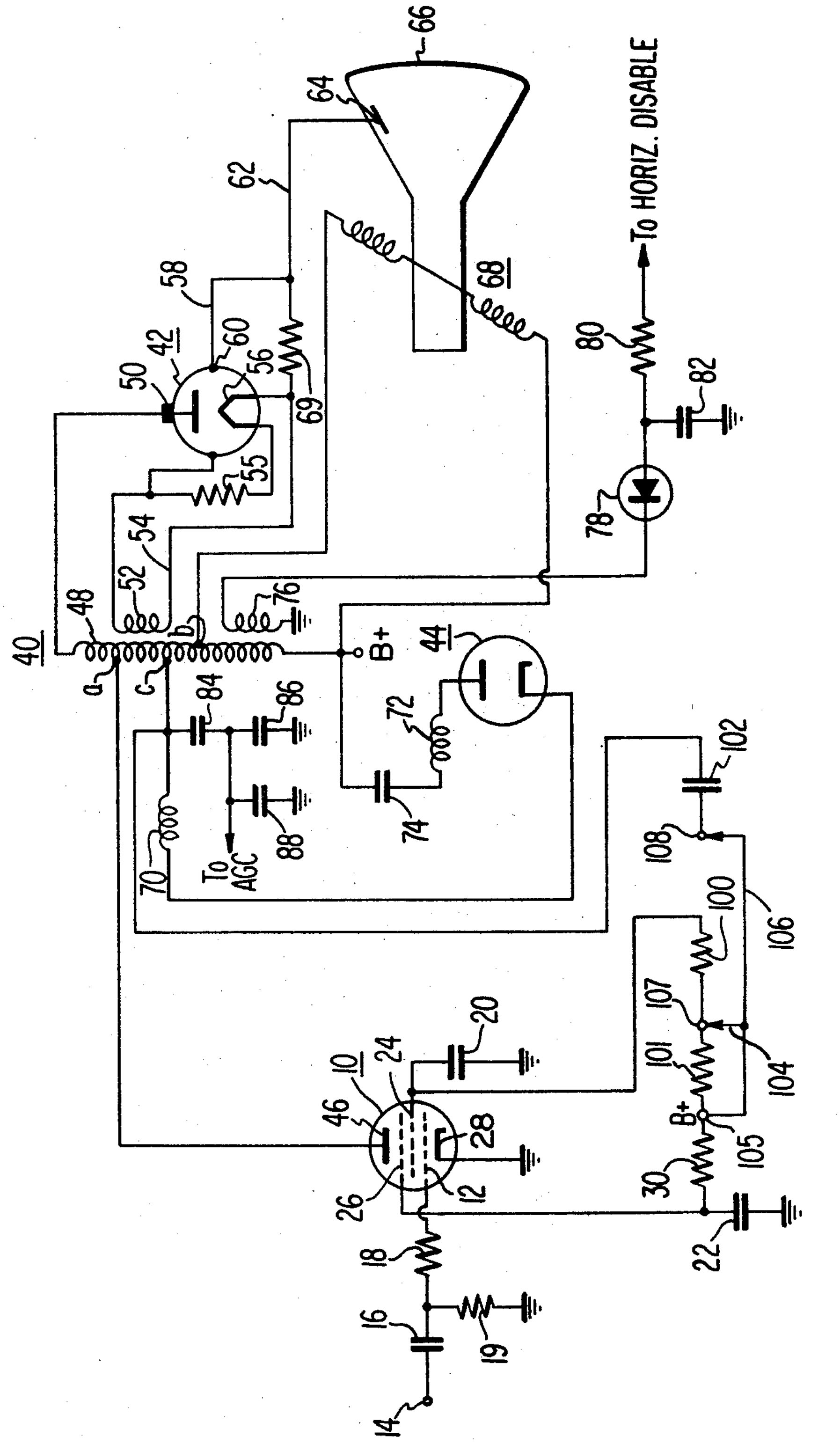

WIDTH CONTROL CIRCUIT FOR A TELEVISION RECEIVER

BACKGROUND OF THE INVENTION

1. Field of the Invention

This invention relates to television receivers, in general, and to a circuit arrangement for controlling the width of its reproduced picture while constraining the high voltage supplied to its cathode-ray kinescope to limit X-radiations, in particular.

2. Description of the Prior Art

In certain arrangements heretofore proposed, the width of a television picture has been controlled by employing a variable resistance which is connected in series with the screen grid of the horizontal output tube of the receiver. Varying this resistance serves to adjust a bias voltage applied to the screen electrode, and the resulting plate current output of the tube, so as to provide a manner of compensating for any differences in operating characteristics which may exist between tubes of the same type classification. Thus, decreasing the resistance can increase the bias voltage on the screen (more positive) and increase the plate current output of a low limit tube to that value at which the horizontal circuitry is designed to operate. Conversely, if a high limit tube providing excessive plate current is present, increasing the resistance can lower the screen voltage to the point at which the intended current flows.

However, situations can foreseeably arise where a high current tube is substituted into a circuit in which a minimum width resistance setting was previously established for a low current tube. With this minimum width resistance, maximum screen voltage and maximum picture width will result, but excessive plate current could flow, and to a point at which the high voltage developed for the system would exceed acceptable limits for X-ray protection. Thus, whether the resistance be of the step-type or of the continuously variable type to compensate for differing tube characteristics, the possibility could arise that the high voltages developed would create X-radiation problems.

A second type of commonly employed width control varies the capacitance in the tuning circuit which determines the horizontal retrace time. Such arrangement changes the energy distribution of the developed flyback pulse, to extend or shorten the retrace pulse duration to adjust picture width. This variation, however, while redistributing the pulse energy over wider or shorter time periods also varies the amplitude of the pulse—from a narrower, larger amplitude pulse to a broader, smaller amplitude pulse. Adjusting the capacitance to redistribute the energy and widen the pulse and reproduced picture thus has the concomitant effect of decreasing the pulse amplitude—and the developed high voltage as a result—, while adjusting the capacitance to narrow the pulse and the picture display increases the high voltage.

If a low limit tube is in the circuit, picture widening can result by increasing the retrace tuning capacitance, but this has the disadvantage that the high voltage developed will be insufficient to provide an optimum picture as the brightness and focus of the reproduced display will suffer. However, substitution of a high limit tube in its place to improve the display undesirably can increase the high voltage to an excessive, X-ray producing level.

SUMMARY OF THE INVENTION

As will become clear hereinafter, the circuit of the present invention provides a width control which combines both the resistive and capacitive features previously known. The screen grid circuit of the horizontal output tube of the television receiver includes a pair of resistors serially coupled to a source of direct bias potential. When it becomes necessary to increase the picture width due to changing tube characteristics (e.g., with a low current tube), one of the two resistors is short circuited by the control, to increase the bias voltage on the tube and the consequent plate current and high voltage developed. If further increase in width is necessitated, instead of short circuiting the second resistor to further decrease the resistance in the screen path—as was heretofore employed with prior art resistor controls—a second step is undertaken by which a capacitor is added to the flyback transformer tuning circuit so as to increase the retrace time and widen the flyback pulse. Besides increasing picture width by this second step, the increased energy of the flyback pulse caused by the screen control is spread over a wider period, and thus constrains the high voltage developed at the same time. A two step width control approach is thus employed, but functions with the advantageous feature of controlling the developed high voltage within prescribed limits.

With a high limit current tube, on the other hand—-where increases in picture width are not necessitated—, both control arrangements will be taken out of the circuit so that maximum screen resistance and minimum retrace capacitance are present. In this instance, the minimum energy will be applied to the flyback transformer, but will be spread over a narrower pulse range to maintain brightness and picture focus at acceptable values.

BRIEF DESCRIPTION OF THE DRAWING

These and other advantages of the present invention will be more clearly understood from a consideration of the following description taken in connection with the accompanying drawing showing a partial schematic circuit diagram of a horizontal deflection and high voltage generating system for a television receiver illustrating a width control circuit embodying the invention.

DETAILED DESCRIPTION OF THE DRAWING

In the drawing, a horizontal output pentode tube is represented by the notation 10, and is supplied at its control grid 12 with a suitable deflection voltage of sawtooth waveform. Such deflection signal is more specifically applied to the grid 12 by way of a terminal 14, a capacitor 16 and a resistor 18, with the capacitor-resistor junction being referenced to ground potential by a further resistor 19. Capacitors 20 and 22 respectively couple the screen and suppressor grids 24, 26 to ground, to which point the cathode electrode 28 of the tube 10 is directly connected. A resistor 30 is included, and couples a source of B+ operating potential to the suppressor grid 26.

A horizontal output transformer 40, a high voltage rectifier tube 42 and a damping rectifier 44 are also shown in the drawing. A primary winding tap "a" of transformer 40 is coupled to the anode electrode 46 of the horizontal output tube 10 while a high voltage secondary winding 48 of the horizontal output transformer 40 is arranged for connection to the anode cap 50 of the rectifier tube 42. Heater current for the tube 42 is supplied via a winding 52 associated with the transformer 40 and coupled via a lead 54 and a resistor 55 across a heater 56 included in the tube 42. A connection 58 is coupled to a mechanical tie point 60 on the tube socket and, in turn, is further coupled by a high voltage lead 62 to the ultor electrode 64 of an image reproducing cathode-ray picture tube or kinescope 66. A horizontal deflection winding 68 associated with the picture tube 66 is also coupled between a primary winding tap "b" and the low voltage end of the transformer 40. Additionally, a resistor 69 is coupled between the lead 54 and the connection 58

Also shown in the arrangement of the drawing is the damping rectifier 44 being coupled by means of inductors 70 and 72 between a further tap "c" on the transformer 40 and a capacitor 74 coupled to the low voltage end of transformer 40, on the one hand, and to the B+ potential source, on the other hand. Additionally shown is a winding 76 provided around the core of the horizontal output transformer 40 to sense the magnitude of the flyback pulse used in developing the necessary high voltage. A rectifier 78 is coupled to receive that pulse at its cathode electrode—with its anode electrode being coupled via a resistor 80 to a transistor bias circuit (not shown) and via a capacitor 82 to ground. Such bias circuit forms part of a horizontal oscillator disabling circuit disclosed in pending U.S. Patent application, Ser. No. 144,457, filed May 18, 1971, directed towards changing the frequency of the horizontal oscillator of a television receiver in response to an indication of increase in the ultor potential developed for its picture tube which could cause dangers of X-radiation. The invention of such horizontal oscillator disabling circuit has been assigned to the same assignee as the invention of the instant disclosure.

Lastly, a pair of capacitors 84, 86 are serially coupled between the primary winding tap "c" and ground, with their junction being coupled to ground by a further capacitor 88 and to the automatic gain control tube of the television receiver (also not shown). Such arrangement is effective in changing the conduction of the automatic gain control amplifier and the consequent biasing of the radio and intermediate frequency amplifier stages of the receiver as a function of varying received signal strengths, the change being keyed by the flyback pulse being applied to the plate of the control tube.

In accordance with the teachings of the present invention, a pair of resistors 100, 101 and a capacitor 102 are also included in the arrangement of the drawing. Resistors 100 and 101 serially couple the screen grid 24 of the horizontal output tube 10 to the source of B+ potential, with means being provided, as by jumper wire 104 to short circuit resistor 101, as desired. Thus, one end of the jumper 104 is connected to the junction of resistor 101 with the B+ source at terminal 105, the other end being effective to couple to a terminal 107, at the junction between resistors 100, 101. A further jumper 106 is connected at one end to B+ terminal 105 and is effective in coupling the capacitor 102 between the inductors 70 and 72 remote from the anode and cathode electrodes of the damper rectifier 44, to change the capacity which, with capacitors 84 and 86 determine the retrace interval of the horizontal deflection waveshape. By completing the connection of jumper wire 104 to the resistor terminal 107 (i.e., at the junction of resistors 100, 101), resistor 101 becomes short circuited. By connecting jumper wire 106 to the terminal 108 connected to capacitor 102, that capacitor is placed effectively in parallel with the combination of capacitors 84 and 86 to change the retrace time of the developed flyback pulse.

It will readily be appreciated that with resistor 100 and resistor 101 in the circuit, that current which flows in the plate circuit of the horizontal output tube 10 will be less than the current that flows when jumper wire 104 is connected to short circuit resistor 101. To thus increase the current so as to develop a reproduced image of greater width, all that is necessary is to connect such jumper 104 to short circuit the resistor 101. If further width is required, then jumper wire 106 can be connected to insert capacitor 102 into circuit without the need for additionally decreasing screen resistance. This changes the retrace time of the developed flyback pulse by increasing its width, so as to decrease the amplitude of the pulse developed and offset thereby the tendency to increase such high voltage. The switching of the jumper wires 104 and 106 will be seen to be a sequential arrangement, whereby the resistors 100 and 101 are both connected, then resistor 101 is short circuited, and then capacitor 102 is added.

That is, three steps of width adjustment are employed. The first step consists of the usual type of horizontal output tube construction wherein a single resistor couples its screen grid to a source of energizing potential, but with the inclusion of an additional resistance to reduce the screen grid voltage for tubes with unusually high plate current so as to limit the amount of energy delivered to the high voltage circuit. The second step merely removes this added resistance from the circuit to allow more energy to be delivered to the high voltage configuration. The third and final step connects an added capacitance across the normal retrace capacitors to increase the retrace time of the horizontal deflection system—which, in turn, lowers the high voltage and thus increases the width of the viewable image without increasing the energy applied to the horizontal deflection system.

Such method of width adjustment differs from the prior art designs previously noted in that there, only one type of width control was used at a given time—e.g., either only screen resistance variation or changes in retrace capacitance. The deficiencies of using only a single type of control as these lay in the fact that under a misadjusted condition, the high voltage produced by the configuration might be dangerously high to the extent that a X-radiation hazard would be produced. For example, if all the screen resistance were removed from the resistance type width control, excessive energy would be applied to the circuit and the high voltage would be increased beyond a safe limit. Also, if all the retrace capacitance were removed in a capacitance type arrangement, the retrace time would be greatly reduced, to allow,as a result, the high voltage to reach an unsafe level. Using a combination of these two circuits, as disclosed, on the other hand, minimizes the energy applied to the circuit and the change in retrace time under a misadjusted condition to constrain the high voltage produced.

While applicant does not wish to be limited to a given set of component values, the following have proved useful in one specific illustration of the present invention:

| | |
|---|---|
| Resistor **18** | 47 ohms |
| Resistor **19** | 330 kilohms |
| Resistor **30** | 27 kilohms |
| Resistor **56** | 1 ohm |
| Resistor **69** | 1 kilohm |
| Resistor **100** | 1.8 kilohms |
| Resistor **101** | 1.2 kilohms |
| Capacitor **16** | 3300 micromicrofarads |
| Capacitor **20** | 0.01 microfarads |
| Capacitor **22** | 0.01 microfarads |
| Capacitor **74** | 0.02 microfarads |
| Capacitor **84** | 150 microfarads |
| Capacitor **86** | 470 microfarads |
| Capacitor **88** | 470 microfarads |
| Capacitor **82** | 15 microfarads — 15 volts |
| Capacitor **102** | 22 microfarads |
| Inductor **70** | 8.2 microhenries |
| Inductor **72** | 8.2 microhenries |
| Horizontal Output Tube **10** | 22JR6 |
| High Voltage Rectifier **42** | 1G3GTA |
| Damper Tube **44** | 17CT3 |
| Energizing Potential B+ | 145 volts |
| Resistor **80** | 6.8 kilohms |
| Cathode-ray Picture tube **66** | 19VAHP4 |

While there has been described what is considered to be a preferred embodiment of the present invention, it will be readily appreciated that other modifications can be made without departing from the teachings herein of combining resistance and capacitive type width controls to establish a means of regulating the width of a displayed picture image while effectively constraining the developed high voltage of a television system.

What is claimed is:

1. In a television receiver having an image reproducing kinescope, a horizontal output tube, a high voltage rectifier circuit and a flyback pulse transformer, the combination comprising:

a source of energizing potential;

resistance means adapted for coupling said potential source to a control electrode of said output tube to establish a bias voltage thereon;

a tuning circuit including capacitance means coupled across a winding of said transformer to establish the amplitude and width of the pulse developed thereby;

first switching means for varying the amount of resistance coupling said source to said horizontal tube control electrode; and second switching means for varying the amount of capacitance within said tuning circuit;

said first and second switching means being operative to controllably vary the output current of said tube and the resulting width of the image reproduced by said kinescope, while constraining the high voltage developed by said rectifier circuit to limits at which X-radiations are not substantially produced.

2. The combination of claim 1 wherein said horizontal output tube is of pentode type construction and said resistance means includes a pair of resistors serially coupling said source of energizing potential to the screen grid thereof.

3. The combination of claim 2 wherein said first switching means includes means for short circuiting at least one of said pair of resistors to control the bias voltage developed at said screen grid when it is desired to vary the output current of said tube.

4. The combination of claim 3 wherein said capacitance means includes a capacitor and wherein said second switching means includes means for inserting said capacitor into said tuning circuit to decrease the amplitude of the pulse developed thereby while increasing its width.

* * * * *